Feb. 1, 1966 J. H. ZDZIEBORSKI ET AL 3,233,166
VOLTAGE STABILIZING SYSTEM
Filed March 4, 1960 2 Sheets-Sheet 1
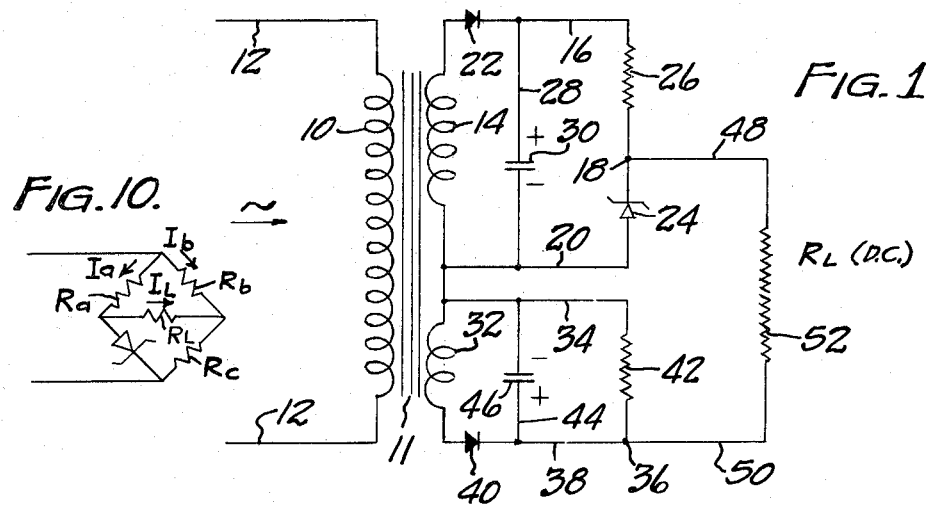
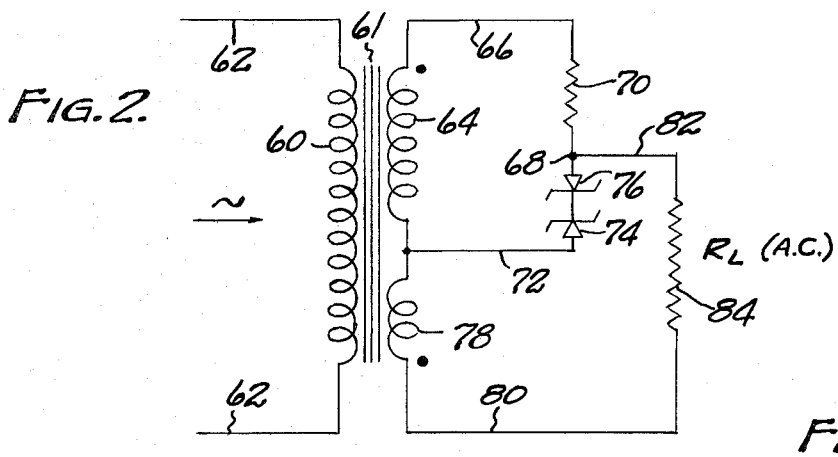
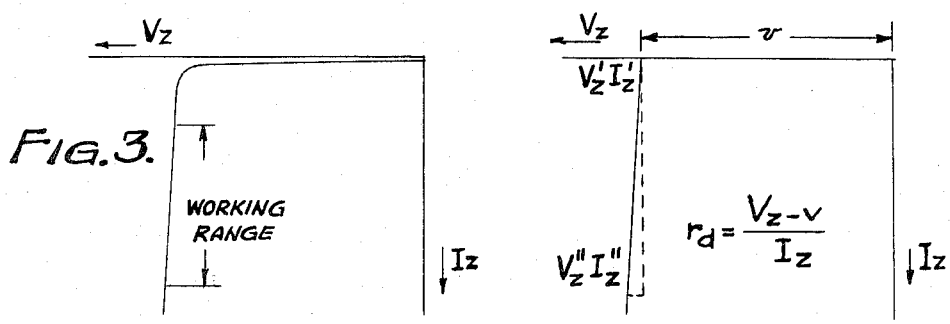
INVENTOR.
JERZY H. ZDZIEBORSKI
CHARLES B. WILSON
BY Eugene C. Knoblock
ATTORNEY.

INVENTORS.
JERZY H. ZDZIEBORSKI
CHARLES B. WILSON
BY Eugene C. Knobleck
ATTORNEY.

United States Patent Office 3,233,166
Patented Feb. 1, 1966

3,233,166
VOLTAGE STABILIZING SYSTEM
Jerzy H. Zdzieborski and Charles B. Wilson, Michigan City, Ind., assignors to The Hays Corporation, Michigan City, Ind., a corporation of Indiana
Filed Mar. 4, 1960, Ser. No. 12,825
9 Claims. (Cl. 323—45)

This invention relates to improvements in voltage stabilizing systems, and more particularly to means for stabilizing the voltage or current of electrical supplies and of the type adapted for employment for regulating both D.C. and A.C. load voltages.

Two basic types of voltage or current regulators exist, namely, the magnetic type and the variable impedance type. Both types have advantages and disadvantages, and their choice usually depends upon the specific function to be fulfilled. The main disadvantages of magnetic regulators which are to be used for A.C. regulation only are their bulkiness, time lag, frequency sensitivity, high harmonics content, and ability to control only the peak value of voltage. The main advantage of magnetic regulators used for A.C. regulation is a relatively high efficiency. Variable impedance regulators have the principal disadvantages of low efficiency and control of only peak value of voltages. The principal advantages of variable impedance regulators are close control or regulation of output voltage, an output independent of frequency, and ability to regulate either A.C. or D.C.

Voltage regulators employing Zener diodes or tube regulators are available and are of two principal types, that is, a simple series-parallel type or a bridge circuit type. Both of these types can be employed for D.C. or A.C. regulation by using a single Zener diode for D.C. regulation and using two Zener diodes connected back to back for A.C. regulation. The same functions can be accomplished by using voltage regulating tubes as voltage regulators. Both types of existing voltage regulators employing Zener diodes or voltage regulating tubes have certain disadvantages. Simple series-parallel type regulators do not compensate for changes in zener voltage with changes in zener current, that is, the output is subject to dynamic resistance, and they control only the peak values of voltage. Regulators using Zener diodes and employing bridge circuits possess capabilities for good regulation and are insensitive to frequency but they are very inefficient. This inefficiency is increased as the regulator is used for A.C. circuits requiring heavy load currents which result from the high A.C. resistance of Zener diodes.

It is the primary object of this invention to provide a voltage stabilizing system which overcomes the disadvantages of prior systems and which is characterized by excellent voltage regulation regardless of variations of supply voltage, a higher efficiency than is obtainable with standard bridge type regulators, a regulation which is substantially independent of frequency through a wide range of variations, and control of any voltage, such as peak voltage, root mean square voltage, average voltage, or any voltage between the above named voltages.

A further object is to provide a voltage stabilizing system which is simple in construction, which operates without time lag or delay, and which has a long life due to the use of semiconductors, such as Zener diodes.

A further object is to provide a voltage stabilizing system wherein a series-parallel regulator is provided with compensating feed back means connected in series with the load.

A further object is to provide a voltage stabilizing system for D.C. currents in which the dynamic resistance of Zener diodes is compensated so as to keep the D.C. voltage independent of changes in zener voltage with changes in zener current.

Other objects will be apparent from the following specification.

In the drawings:

FIG. 1 is a diagrammatic illustration of the system used to stabilize direct current applied to a load;

FIG. 2 is a diagrammatic illustration of the system applied to regulate an alternating current voltage applied to a load;

FIG. 3 is a curve illustrating the operating characteristic of a Zener diode;

FIG. 4 is a mathematical or equivalent representation of the operating characteristic of a Zener diode;

Figure 6:
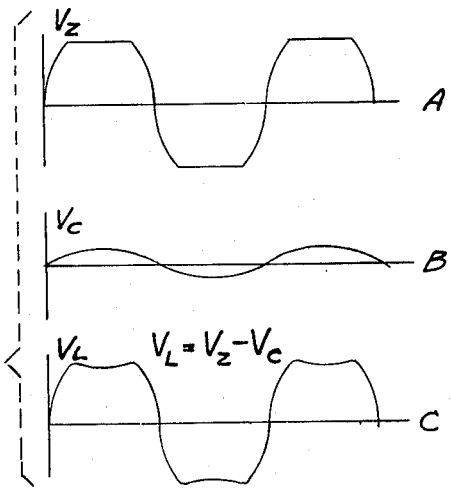
Figure 7:
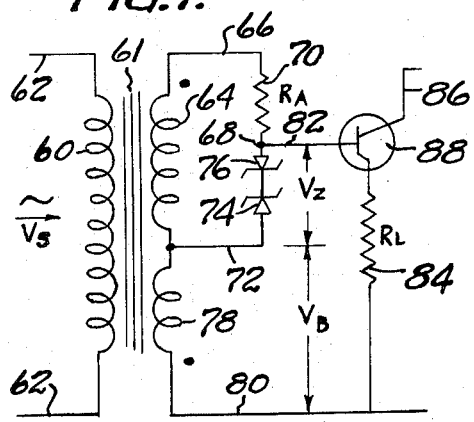
Figure 8:
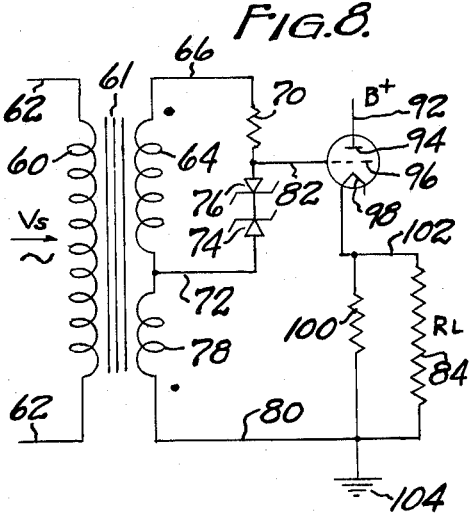
Figure 9:
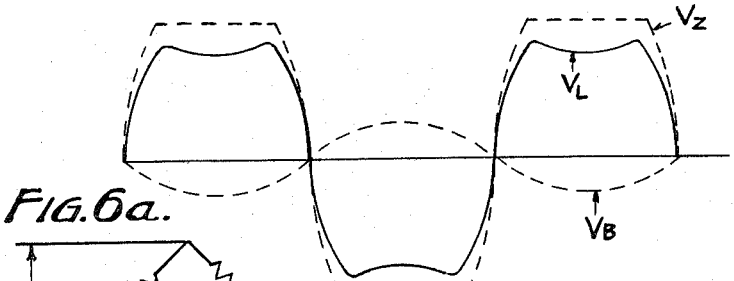

FIG. 6 constitutes curves illustrating the output wave form resulting from an effort to secure regulation of a voltage supply system through the use of Wheatstone bridge circuitry;

FIG. 6ª illustrates a Wheatstone bridge circuit whose output curves are shown in FIG. 6;

FIG. 7 is a diagrammatic illustration of the system applied to the regulation of an alternating current voltage and illustrating the instantaneous polarity thereof and the connection of an amplifier of the emitter follower type therein;

FIG. 8 is a diagrammatic illustration of the system applied to an A.C. load and having an amplifier utilizing a multiple-element electron tube;

FIG. 9 is a graph illustrating the alternating current load produced by the use of the systems described in FIGS. 2, 7 and 8.

FIG. 10 is a diagram illustrating a Wheatstone bridge circuit usable with a voltage stabilizer for a D.C. load.

Referring to the drawings, FIG. 1 designates a system for the regulation of direct current to a load by the use of one or more Zener diodes and a series connection of the load with a compensating feed back potential. The system employs an alternating current supply feed to the primary 10 of the transformer by leads 12. A secondary 14 of the transformer has a lead 16 connected at one end thereof and extending to a terminal 18. The other end of the secondary 14 of the transformer is connected by lead 20 with the terminal 18. A rectifier 22 is connected to lead 16, and one or a series of Zener diodes 24 is connected in lead 20, said rectifier and Zener diode accommodating current flow in the respective leads unidirectionally. A resistor 26 is connected in lead 16 between rectifier 22 and the terminal 18. A conductor 28 connects the leads 16 and 20, being connected to the lead 16 between the rectifier 22 and the resistor 26 and being connected to the lead 20 between the secondary 14 and the Zener diode 24. A capacitor 30 is connected in the lead 28.

Another transformer secondary 32, having a selected small number of turns and being fed from the same supply source to which leads 12 are connected, is suitably oriented to a supply actuated primary, here shown as the transformer primary winding 10. It will be understood, however, that while the secondary is here illustrated as being wound upon the core 11 along the windings 10 and 14, the secondary coil 32 may be a part of a separate transformer, such as a variac connected with the same supply source feeding coil 10, if desired. Lead 34 connects one end of the secondary coil 32 with terminal 36, and lead 38 connects the other end of transformer secondary coil 32 with terminal 36. A rectifier 40 is connected in lead 38 and a resistor 42 is connected in lead 34. Lead 44 connects the leads 34 and 38, the connection preferably being effected at lead 34 between the coil 32 and the resistor 42 and being effected at lead 38 between rectifier 40 and terminal 36. A capacitor 46 is connected in the lead 44.

Output lead 48 is connected with terminal 18 and an output lead 50 is connected with terminal 36, and the direct current load 52 is connected across the leads 48 and 50.

The circuit will be so connected that the polarity at the capacitors will be that illustrated in FIG. 1. Specifically, the polarity of the part of lead 28 connected with lead 16 will be positive, and that connected at lead 20 will be negative, when the polarity of the part of lead 44 connected with lead 38 is positive, and that part of lead 44 connected with lead 34 is negative, and vice versa. Another characteristic of the circuit is that the resistor 42 is preferably selected to have a resistance equal to the dynamic resistance of zener diode 24. Thus the compensating feed back potential from the compensating secondary coil 32 effects compensation for the dynamic resistance of the zener diode. It also keeps the direct current voltage applied to the load independent of changes in zener voltage with changes in zener current.

The system provides excellent voltage regulation with supply voltage variations. Another advantage of the system is that it provides a much higher efficiency of operation than can be obtained by the use of standard bridge regulators because there is no waste of power as will occur in a bridge circuit. The response of the system is instantaneous and the use of the zener diodes, being solid state components, affords long life and trouble-free operation of the system.

FIG. 2 illustrates a system useful for regulation of the voltage of an alternating current load. In this system, the primary winding 60 of a transformer is fed by leads 62 and the core 61 of the transformer has secondary winding 64 wound thereon. A lead 66 connects one end of the secondary winding 64 with a terminal 68, and this lead 66 has a resistor 70 connected therein. A lead 72 connects the opposite end of the transformer secondary 64 with the terminal 68 and has interposed therein two zener diodes 74 and 76 arranged back to back.

A transformer secondary winding 78 fed from the same supply source as primary winding 60, and preferably coupled with the primary winding 60 as illustrated, has one end thereof connected to the lead 72. The other end of the winding 78 is connected to a lead 80. A lead 82 extends from the terminal 68. The alternating current load 84 is connected across the leads 80 and 82. This voltage stabilizing system applied to an A.C. load has the same advantages as the system applied to a direct current load, and, further, is characterized by ability to control any voltage, such as peak voltage, root mean square voltage, average voltage, or any wave form of voltage between the aforementioned types of voltages. Another advantage is that the voltage regulation achieved is independent of frequency through a range of substantially plus or minus thirty percent.

In both the FIG. 1 and FIG. 2 systems, it will be understood that zener diodes are illustrated and described for purposes of convenience, but that the systems are not limited to the use of zener diodes in the sense of being semi-conductors. Thus neon voltage stabilizers may be used in place of solid state zener diodes. The elements 24, 74 and 76 in FIGS. 1 and 2 may be any voltage limiting device in which large increases in current may be accommodated above an initial value but substantially no increase in voltage, or only limited increases in voltage, are accommodated. FIG. 3 is a graph illustrating the characteristic operation of a voltage limiting device of the character in question, commonly referred to herein as having a "zener characteristic." It will be apparent from FIG. 3 that substantially no current flows in the device until the voltage reaches a break point. This break point is sharp and occurs at a selected voltage depending upon the characteristic of the zener diode and which is normally low compared to the break point of a rectifier. Current flow from the zener point is rapid and only a slight change in voltage occurs with a very large change in current. This makes possible the selection of a working range of the zener element in which wide current variations may occur with substantially negligible voltage changes, said voltage changes occurring in a preselected fixed ratio to current changes to produce a characteristic known as the "zener slope."

FIG. 4 constitutes a variant of the graph of the zener characteristic which is useful to simplify mathematical calculations, such as: $V_z$ equals $v+I_z r_d$. In this equation $v$ and $r_d$ are constant for the specific zener element employed and $r_d$ designates the dynamic resistance of the zener element, that is, its characteristic failure to compensate zener voltage with changes in zener current.

In the case of a D.C. series-parallel regulator, $V_z$ equals $V_L$, that is, zener voltage equals a load voltage. In a well designed regulator, the operating zener current $I_z$ is well beyond the zener curve or break point and varies only by a small amount with changes in supply voltage. This operating current is determined by the value of a protective current limiting resistor in the circuit, such as resistor 26 or resistor 70. As a result of this operating current value, the dynamic impedance $r_d$ of the zener element is small but zener voltage $V_z$ and hence load voltage $V_L$ are still slightly changing, with the change being dependent upon the slope of the zener dynamic impedance $r_d$ and the changes in zener current $I_z$.

It is possible to compensate for this change in load voltage by employing a simple bridge circuitry as illustrated in FIG. 10, but this would result in poorer efficiency of the unit. Referring to such a bridge circuit, as shown in FIG. 10.

$$V_z = V_L + V_c$$

and $$V_z = v + r_d I_z$$
$$V_c = (I_b + I_L) R_C$$

therefore $$v + r_d I_z = V_L + I_L R_C + I_b R_C$$

$v$ and $r_d$ are constants depending upon the zener diode employed $V_L$ and $I_L$ to be constant therefore:

any changes in $r_d I_z$ must be compensated by $I_b R_C$ hence:

$$v = V_L + I_L R_C$$

therefore:

$$R_C = \frac{v - V_L}{I_L}$$

and from $$I_b R_C = I_z r_d$$

$I_z$ is known (preferable operating current)

therefore:

$$I_b = \frac{I_z r_d}{R_C}$$

and $$R_B = \frac{V_b}{I_b} = \frac{V_s + V_L - V_z}{I_b}$$

and $$R_A = \frac{V_s - V_z}{I_s + I_L}$$

In such a bridge circuit $V_z$ increases at the same rate as $V_c$ over the operating range and the differential $V_L$ remains constant. This mathematical analysis has been confirmed by test of a D.C. constant voltage unit employing zener diodes and a bridge circuit.

Figure 5:
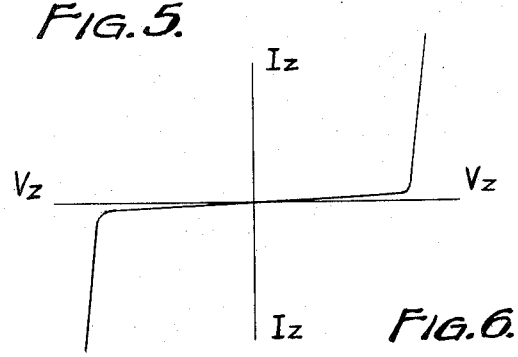
FIG. 5 is a curve illustrating the operating characteristic of two Zener diodes arranged back to back.
Figure 6A:
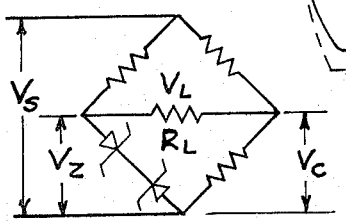

The analysis of an A.C. bridge circuit, as in FIGS. 2 and 6a, is more complicated than that for D.C. bridge circuitry due to the fact that the zener dynamic impedance is changing non-linearly. In consideration of the circuit of FIG. 6a it is important to observe that the resultant characteristic of zener diodes positioned back to back is that illustrated in FIG. 5. In this connection it will be assumed that the back-to-back zener diodes have similar characteristics and, consequently, that the zener slopes will be equal, as illustrated in FIG. 5.

The use of back-to-back zener diodes produces an output wave form in a simple series-parallel zener diode alternating current regulator, as illustrated at graph A in FIG. 6. A consideration of the graph A in FIG. 6 reveals that only peak-to-peak value of voltage is being controlled and that, with changes of supply voltage, the area under the graph varies. This will result in a variable root mean square power output. The regulation factor that can be obtained with a simple series-parallel zener diode A.C. regulator is very low, being approximately five to one. It will be understood in this connection that a simple series-parallel zener diode regulator entails positioning back to back zener diodes across a supply line, one lead of which has a protective current limiting resistor, such as element 70, interposed therein, and the load being connected across the supply line in parallel relation to the back-to-back zener diodes. The poorer regulation effected in such a device is explained by the fact that the voltage across the zener diode swings from zero to zener voltage resulting in a high dynamic impedance or resistance $R_d$. The dynamic resistance $R_d$ at any instant equals the zener voltage $V_z$ at any instant divided by the zener current $I_z$ at that instant.

If a bridge circuit is designed similar to that shown in FIG. 10 wherein back-to-back zener diodes are employed as in FIG. 6a, it is possible to provide a constant root mean square voltage or any other desired output. This result is shown diagrammatically in FIG. 6, wherein the compensating or bucking voltage $V_c$ is produced as illustrated in graph B in FIG. 6, and modifies the voltage output $V_z$ shown in graph A to produce the output or load voltage $V_L$ as seen in graph C in FIG. 6. Thus load voltage $V_L$ is equal to zener voltage $V_z$ minus compensating voltage $V_c$.

In a compensating bridge circuit, an increase of supply voltage increases the area outlined in the graph A of FIG. 6 across the zener voltage $V_z$. Similarly the area under the compensating voltage $V_c$ in graph B of FIG. 6 increases. This results in a wider load voltage $V_L$ being formed but with a larger notch, as seen in graph C of FIG. 6. By selecting a proper resistor $R_c$ in a bridge circuit for a back-to-back zener regulator with A.C. output, it is possible to adjust the magnitude of the notch shown in graph C of FIG. 6 so that the root mean square voltage, the average voltage, or any other required output voltage can be kept constant. The interesting characteristic of a bridge circuit used with an A.C. regulator of the double zener diode type is that that there is a changing dynamic impedance of the zener diode, and consequently current $I_b$ in the bridge circuit is subject to larger changes or swings, which result in a high loss in the $R_b$ and $R_c$ resistors, and, therefore, the voltage regulation secured by the use of such a bridge is more inefficient. The important difference between the D.C. and A.C. bridge is that while D.C. voltage varies about small changes of one polarity and hence zener diode operates over a small steep part of its characteristic, the A.C. voltage reverses its polarity each half cycle. This forces each zener diode to operate each half cycle over a large portion of its characteristic curve, starting at zero. This causes considerable increase in the average value of dynamic impedance of zener diode and this, in turn, lowers the efficiency of the bridge circuit.

In analyzing the previously developed mathematical formulas, it is important to note that since in an A.C. circuit $I_z r_d$ is large, due to the large value of the dynamic resistance $r_d$, and since $R_c$ must be kept relatively small, the bridge current $I_b$ must be large so that large losses $I_b^2 R_b$ and $I_b^2 R_c$ result.

The potential feed back circuit forming the subject of this application and illustrated in FIGS. 1 and 2 greatly improves the efficiency of a series-parallel regulator. The feed back circuit performs in the same manner as a compensating bridge circuit but considerably reduces the losses because the resistances $R_b$ and $R_c$ used in the bridge circuit are eliminated. FIG. 9 illustrates the instantaneous voltage of a stabilizing device for an alternating current load, and it will be seen therefrom that the voltage $V_L$ across the load equals the zener voltage $V_z$ plus the compensating voltage $V_b$. The resultant wave produced with the feed back circuit is illustrated in FIG. 9 and will be seen to be similar to the wave produced across a series-parallel regulator of the zener diode type provided with a compensating bridge circuit, as seen in graph C of FIG. 6.

A similar method of compensation can be used in D.C. circuits and entails rectifying the zener voltage $V_z$ and a compensating voltage $V_c$.

It is evident that by controlling the compensating voltage $V_b$ in the circuit shown in FIG. 7, the magnitude of the notch in the graph (FIG. 9) of the load voltage $V_L$ can be controlled. Thus, by proper selection of the compensating voltage $V_b$, the root mean square voltage, average voltage, peak voltage or any other voltage can be kept constant. Also, if necessary, the load wave form may be reshaped by the use of a shaping network (not shown). A further characteristic of the device is that temperature compensation can be provided by placing a temperature sensitive resistor (not shown) across the compensator voltage $V_b$ or in series with it.

One important characteristic of the voltage stabilizing system applied in an A.C. circuit is that the use of an equivalent transformer circuit, as explained above, instead of a conventional four arm resistive bridge circuit reduces the losses in power occurring in the compensating bridge resistance. This enables a higher proportion of the input power to be used for load regulation.

This type is more accurate than a series type zener voltage regulator because it is possible to select components of such values as to exactly compensate for the slope of the zener diode. This can be done without sacrifice of any of the efficiency characterizing a series type zener voltage regulator. The device is very much more accurate than transformer regulators operating on a flux density saturation curve and characterized by sensitivity to frequency variations in the supply line.

An improved efficiency can be achieved by feeding the output voltage of this voltage stabilizing system into an amplifier. FIG. 7 illustrates the connection of an emitter follower 88 with lead 82, being supplied by line 86 leading to an unregulated source.

Another type of amplifier, such as a cathode follower, as illustrated in FIG. 8, wherein lead 92 from the unregulated power supply feeds the plate 94 of an electron tube, and lead 82 is connected with a grid 96 of the tube, while cathode 98 of the tube is connected with the load 84. A resistor 100 may extend from the cathode lead line 102 to the lead 80, and the circuit may be grounded at 104.

The voltage stabilizing system disclosed herein is insensitive to variations in line frequency over a wide range of variations. Thus, whereas lack of uniformity of the A.C. component in prior A.C.–D.C. systems and voltage variations can be of considerable importance in limiting accuracy or stability, the present system avoids such limitations. Also, in prior devices of the magnetic wave type where alternating current voltages can be held constant, a great sensitivity to line frequency variations may exist, so that the utility of such magnetic wave types of devices is limited. The lack of sensitivity to line frequency over a wide range of variations in the present device overcomes this disability of the prior devices. As a consequence, the field of use of the present voltage stabilizing system can be considerably extended as compared to previous voltage stabilizing systems. One important field into which the system can be extended is the field of mobile portable power sources where frequency control is unreliable or unstable.

While the preferred embodiments of the invention have been illustrated and described, it will be understood that changes may be made within the scope of the appended claims without departing from the spirit of the invention.

We claim:

1. A voltage stabilizing system, comprising a current source, a series-parallel regulator energized by said source and a magnetically induced compensating feed back means energized by said source, said regulator and said means being connected in series with a load having two terminals, said regulator having a pair of leads connected to one load terminal and including a rectifier in one lead and a zener element in the other lead, the feed back means being connected to both load terminals and including a rectifier.

2. A voltage stabilizing system, comprising a current source, a series-parallel regulator energized by said source, compensating feed back means magnetically coupled with said source, and a load having two terminals, said regulator having two leads connected to one load terminal and including a zener voltage limiting device in one lead accommodating large changes in current but only limited increases in voltage above an initial value, and a rectifier in the other said lead, the feed back means being connected to said load terminals and including a rectifier.

3. A voltage stabilizing system comprising a current source, a series-parallel regulator energized by said source, compensating feed back means magnetically coupled with said source, said regulator and feed back means being connected in series with a load having two terminals, said regulator having two leads connected with one load terminal and including a voltage limiting device in one lead having a zener characteristic and a protective current limiting resistor in the other said lead, the feed back means being connected to said terminals and including a rectifier.

4. A voltage stabilizing system comprising a current source, a series-parallel regulator energized by said source and having two leads and including a zener element and a rectifier connected in different leads and a protective current limiting resistor, a compensating feed back means magnetically coupled with said source, and a load having two terminals, said regulator being connected at both leads thereof to one load terminal, said feed back means being connected at both load terminals and including a rectifier.

5. A voltage stabilizing system comprising a source of current, a series-parallel regulator energized by said source and having two leads and including a zener element and a protective current limiting resistor, a compensating feed back means magnetically coupled with said source, said regulator having an output terminal, said feed back means having a pair of output terminals, and a load connected to said feed back terminals and connected to said regulator terminal, said regulator and feed back means including a common lead, said zener element consisting of two zener diodes arranged back to back in said common lead, said protective resistor being located in said voltage regulator circuit in a lead different from said common lead.

6. A voltage stabilizing system comprising a source of current, a series-parallel regulator energized by said source and having two leads and including a zener element and a protective current limiting resistor, a compensating feed back means magnetically coupled with said source, said regulator having an output terminal, said feed back means having a pair of output terminals, and a load connected to said feed back terminals and connected to said regulator terminal, said regulator and feed back means including a common lead, said zener element consisting of two zener diodes arranged back to back in said common lead, said protective resistor being located in said regulator circuit in a lead different from said common lead and amplifying means connected with a current supply and interposed between the terminal of said regulator and said load.

7. A voltage stabilizing system comprising a source of current including a transformer primary winding, a series-parallel regulator circuit including a transformer secondary winding, a zener unit, a protective resistance and an output terminal, and a compensating feed back circuit including a transformer secondary winding, a rectifier and a pair of terminals, and a load connected to said feed back terminals and connected to said regulator terminal, both of said transformer secondary windings being responsive to said transformer primary winding.

8. A voltage stabilizing system comprising a series-parallel regulator circuit including a transformer secondary winding, a zener unit, a protective resistance and an output terminal, and a compensating feed back circuit including a transformer secondary winding, a rectifier and a pair of terminals, and a load connected to said feed back terminals and connected to said regulator terminal, and a transformer primary winding common to both transformer secondary windings.

9. A voltage stabilizing system comprising a series-parallel regulator circuit including a transformer secondary winding, a zener unit, a protective resistance and an outlet terminal, a compensating feed back circuit including a transformer secondary winding, a rectifier and a pair of terminals, and a load connected to said feed back terminals and connected to said outlet terminal of said regulator, both of said transformer secondary windings being responsive to a common supply voltage, said regulator circuit having two leads connected ot opposite ends of its secondary winding and to said outlet terminal, said protective resistance being interposed in one of said leads and said zener unit being interposed in the other lead, said zener unit constituting two zener elements arranged back to back, said zener containing lead constituting a lead of said feed back circuit.

References Cited by the Examiner
UNITED STATES PATENTS

| | | | |
|---|---|---|---|
| 2,431,994 | 12/1947 | Bibrell et al. | 321—18 |
| 2,753,513 | 7/1956 | Sola | 323—48 |
| 2,861,239 | 11/1958 | Gilbert | 307—88.5 X |
| 2,886,767 | 5/1959 | Naster | 323—45 |
| 2,962,649 | 11/1960 | Baum | 321—16 |
| 2,965,771 | 12/1960 | Finkel | 307—88.5 X |
| 3,008,084 | 11/1961 | Cotton | 307—88.5 X |
| 3,017,550 | 1/1962 | Dickson | 307—88.5 X |
| 3,070,744 | 12/1962 | Upton | 307—88.5 X |
| 3,166,276 | 1/1965 | Goerner et al. | 244—77 |

LLOYD McCOLLUM, *Primary Examiner.*

ROBERT L. SIMS, MILTON O. HIRSHFIELD,
*Examiners.*